United States Patent
Lautenschlager et al.

(10) Patent No.: US 6,744,871 B2
(45) Date of Patent: Jun. 1, 2004

(54) METHOD FOR ROUTING SERVICE CALLS IN A TELECOMMUNICATION NETWORK, AS WELL AS A TELECOMMUNICATION NETWORK, SWITCHING CENTER AND PROGRAM MODULE THEREFOR

(75) Inventors: Wolfgang Lautenschlager, Weissach-Flacht (DE); Hartmut Weik, Stuttgart (DE); Heike Felbecker-Janho, Korntal-Müchingen (DE)

(73) Assignee: Alcatel, Paris (FR)

( * ) Notice: Subject to any disclaimer, the term of this patent is extended or adjusted under 35 U.S.C. 154(b) by 470 days.

(21) Appl. No.: 09/852,703

(22) Filed: May 11, 2001

(65) Prior Publication Data

US 2001/0046286 A1 Nov. 29, 2001

(30) Foreign Application Priority Data

May 12, 2000 (DE) .......................... 100 23 432

(51) Int. Cl.⁷ ................................. H04M 3/42
(52) U.S. Cl. ........................... 379/207.02; 379/218.01; 379/221.08
(58) Field of Search .............. 379/207.01–207.16, 379/220.01, 221.01, 221.02, 218.01, 243, 221.08, 221.09, 219, 220, 230

(56) References Cited

U.S. PATENT DOCUMENTS

| | | | | |
|---|---|---|---|---|
| 5,903,639 A | | 5/1999 | Lipchock et al. | |
| 6,101,250 A | * | 8/2000 | Tiainen | 379/207 |
| 6,118,777 A | * | 9/2000 | Sylvain | |
| 6,128,503 A | * | 10/2000 | Granberg et al. | 455/461 |
| 6,130,941 A | * | 10/2000 | Nimmagadda et al. | 379/230 |
| 6,243,457 B1 | * | 6/2001 | Lin et al. | 379/230 |
| 6,282,277 B1 | * | 8/2001 | DeBalko | 379/201 |
| 6,327,357 B1 | * | 12/2001 | Meek et al. | 379/218.01 |
| 6,567,513 B2 | * | 5/2003 | King | 379/221.02 |

FOREIGN PATENT DOCUMENTS

| | | |
|---|---|---|
| DE | 195 15 856 A1 | 10/1996 |
| EP | 0 886 448 A2 | 12/1998 |
| WO | WO 97/36431 A1 | 10/1997 |

* cited by examiner

*Primary Examiner*—William J Deane
(74) *Attorney, Agent, or Firm*—Sughrue Mion, PLLC

(57) ABSTRACT

A method for routing service calls in a telecommunication network, in particular those associated with the intelligent network of a network operator (TP), with a switching center recognizing the service call and a control facility controlling the service call.

The call coming from the subscriber (TN) is recognized as a service call and the control facility receives an information signal (IDP) via the switching center.

If the control facility can neither resolve the service number down to a physical address, nor determine the network operator in whose network the service is provided, the switching center receives a message via the control facility, and forwards the service call to a further switching center via the switching center.

4 Claims, 1 Drawing Sheet

METHOD FOR ROUTING SERVICE CALLS IN A TELECOMMUNICATION NETWORK, AS WELL AS A TELECOMMUNICATION NETWORK, SWITCHING CENTER AND PROGRAM MODULE THEREFOR

BACKGROUND OF THE INVENTION

The invention concerns a method for routing service calls in a telecommunication network with a switching center (SSP) recognizing the service call and a control facility (SCP) controlling the service call, as well as a telecommunication network with a switching center (SSP) recognizing a service call of a subscriber (TN) and a control facility (SCP) controlling the service call, a switching center with recognition means for recognizing service calls of a subscriber (TN) and communication means for exchanging messages with a control unit (SCP) for controlling service calls and a program module therefor.

Today the public switched telephone network (PTSN/ISDN) consists of the (sub) networks of various national, regional and local network operators. In addition to the conventional service of establishing communication calls, these network operators are increasingly offering additional so-called value added services, for example the setting-up of a so-called personal call number, by which a call is routed under time control to the service customer's desired line unit. Specific facilities of the network operator, which are integrated in the infrastructure of the conventional telecommunication network, are used to control and perform these services. The best known of these facilities are those facilities which form the so-called intelligent network (IN for short). The services which this facilitates are also termed IN services. The architecture of the intelligent network and the structure of the IN services are laid down in the corresponding ITU-T standards.

The so-called service switching point SSP and the so-called service control point SCP form the two essential facilities of an intelligent network. The service switching point SSP is a digital switching center which recognizes an IN service call and gives the service control point SCP the option to control the call. A frequent option for calling up a specific service of the intelligent network is to dial an (IN) service number. In this case the leading numerical sequence of the service number forms the service identification of a specific IN service. The service switching point SSP recognizes the IN service call and informs the service control point SCP which is resolving the service number, that is to say the determination of the physical address of that facility with which the subscriber has to be connected in order for the service to be implemented. The service then runs under the supervision of the service control point SCP. A detailed description of the tasks of the service switching points SSP and of the service control points SCP in an intelligent network is given on pages 105–117 of the book "Intelligent Netze" ("Intelligent Networks") by Gerd Sigmund, published in 1999 by Hüthig Verlag, Heidelberg (ISBN3-7785-3908-6).

In this connection, the invention is not restricted to the intelligent network, but covers equivalent network operator's facilities and processes by means of which value added services can be offered. The network operator today therefore offers a large number of specific services outside the intelligent network. For example, these services can be realized with the aid of additional functions in the digital switching centers. Since these functions are comparable to those of the intelligent network, the description below is limited to embodiments in the intelligent network.

While at the start the intelligent network was mainly installed and operated country wide and centrally by a national network operator, IN services are also increasingly being offered by other network operators. Many of these network operators are building their own network infrastructure to do this. A network operator's infrastructure is regarded as an own intelligent network if the network operator is able to recognize and process service calls.

While the functions of the service switching points SSP are of a decentralized type, and today are usually integrated in every local switching center, the functions of service control points are of a centralized type. In this case, each service number existing in the national network beyond the limits of the respective network operator has to be resolved so that the call can either be switched to a specific physical address of a facility, or the network operator determined in whose intelligent network the service associated with the service number is performed. As a result, a subscriber can direct a service call to any desired network operator, irrespective of which network operator is performing the service. This transparency of service numbers in relation to the network operators is also termed service number portability (SNP). The service numbers and the associated data concerning addresses and network operators are usually stored in high-capacity databases of the service control point SCP. Here the service control point SCP of a large network operator is formed from a number of networked computers which communicate with each other for example via a so-called high-capacity local area network LAN.

This architecture is a problem for small, mostly local network operators which often cover only the area of a town. The operation and maintenance of a database for resolving all service numbers extending beyond their own service numbers would represent a disproportionately large outlay for many of these network operators. If one such network operator operates his own intelligent network without such a database, then in order to guarantee service number portability, initially he basically always has to relay all calls from IN services to a large national network operator who then resolves the call number.

To be able to execute service calls without rerouting via a national network operator and without needing to interrogate such a database, a process is conceivable in which service number portability is dispensed with and only service numbers of those IN services are resolved, which can be provided in the intelligent network of the called local network operator. Other (IN) service calls are cleared in reverse, that is to say these calls are cancelled. The subscriber then has to direct a repeat service call to another, preferably country-wide network operator. This process is of course less user-friendly and would probably severely reduce the acceptance of local IN services of this type. Furthermore, service number portability is a legal requirement in many countries.

SUMMARY OF THE INVENTION

Now the object of the invention is to create a process and suitable means that make it possible, in particular for local network operators, to perform IN services without rerouting via a further network operator and without the local network operator having to know the necessary service numbers of IN services that are not provided in his network.

This object is achieved according to the invention by a method for routing service calls in a telecommunication network, with a switching center recognizing the service call and a control facility controlling the service call, a telecommunication network with a switching center recognizing a service call of a subscriber and a control facility controlling the service call, a switching center with recognition means for recognizing service calls of a subscriber and communication means for exchanging messages with a control unit for controlling service calls and a program module to be executed in a switching center.

The fundamental idea of the invention is that always when the resolution of a service number is not possible with the aid of the local database, this call is passed to a further, preferably national network operator. In this case the network operator to whom the call is being transferred does not necessarily have to be the correct addressee of this service. It could be conceivable that this network operator also is unable to manage the complete resolution of the service number and further forwards the call.

Further developments of the invention are revealed in the description below.

BRIEF DESCRIPTION OF THE DRAWINGS

The invention is explained in more detail below with the aid of the accompanying drawings, of which.

DETAILED DESCRIPTION OF THE INVENTION

The resolution of a service number can generally lead to one of the following results:

a: the service number can be fully resolved and the physical address of the unit determined, to which the subscriber has to be switched for the provision of the service, b: the service number can be partially resolved and the network operator determined in whose network the service is provided (service number portability), or c: the service number cannot be resolved, that is to say it is unknown.

Figure 2:
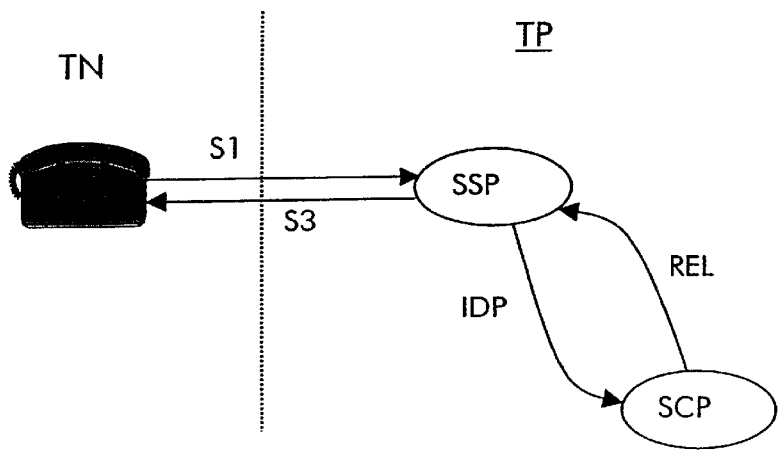
FIG. 2 shows an example of a process according to the prior art, in an intelligent network where a service number cannot be resolved.
Figure 3:
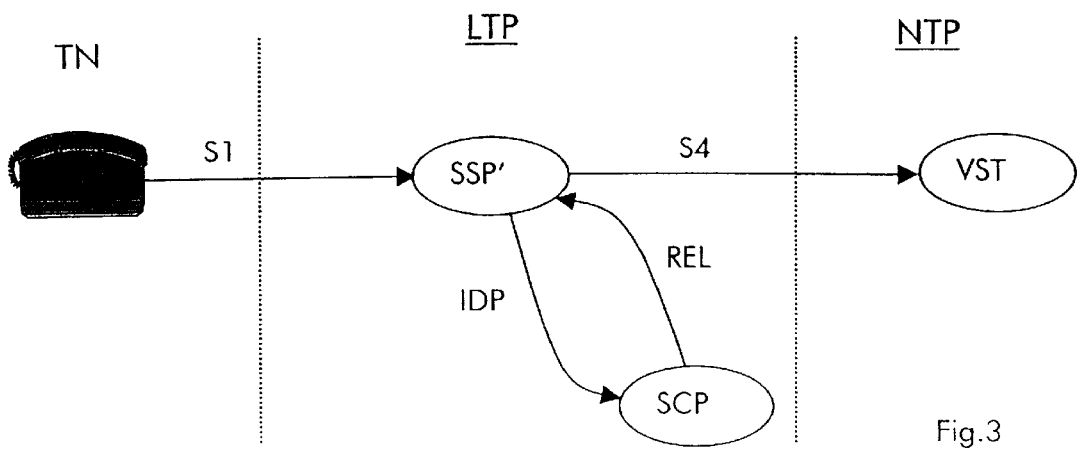
FIG. 3 shows an example of a process according to the invention in an intelligent network where a service number cannot he resolved.

The process for case a and case b is satisfactorily implemented by the prior art. Case a is shown by way of example in FIG. 1. Case b is also dealt with in the explanation of FIG. 1. The process according to the prior art for case c is illustrated in FIG. 2 and then the process according to the invention for case c is illustrated in FIG. 3.

Figure 1:
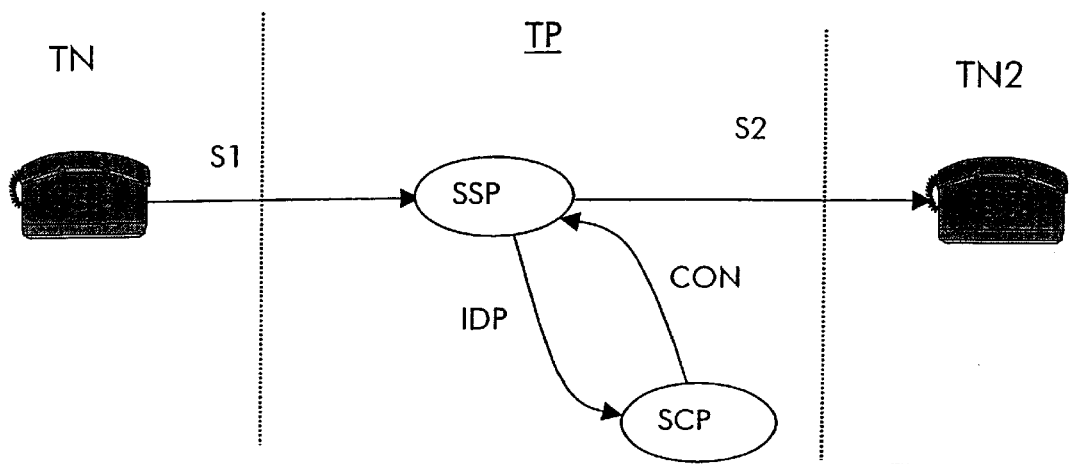
FIG. 1 shows an example of a process according to the prior art, in an intelligent network where a service number can be resolved.

FIG. 1 shows from left to right a first subscriber TN, a network operator TP and a further subscriber TN2. Here a service switching point SSP and a service control point SCP are shown as units of the network operator TP. An arrow S1 leads from the subscriber TN to the service switching point SSP, from there an arrow TDP leads to the service control point SCP and from there an arrow CON leads back to the service switching point and from there an arrow S2 leads to the subscriber TN2. In this case the arrows S1, S2, IDP and CON represent messages transmitted in the direction of the arrow. In this example the service switching point is integrated in a local switching center; this integrated facility is hereafter denoted as a service switching point SSP.

If the subscriber TN calls up a service of the intelligent network, then he dials a specific service number, for example the standard directory number of the subscriber TN2, as described above. This service number is forwarded with the message S1 to the service switching point SSP. The service number contains a specific service identification by means of which the service switching point SSP recognizes the IN service and thereupon informs the service control point SCP about the call via the message IDP. The service control point SCP checks that the service number is complete and requests additional information if required. The service control point SCP then resolves the service number, that is to say it determines the physical address of that facility to which the subscriber is to be connected for the performance of the service. In this case he should simply be connected to the subscriber TN2 whose standard directory number refers to one or more possible physical addresses (directory numbers) in accordance with specific criteria. With the message CON containing the directory number of the subscriber TN2, the service switching point is requested to establish the connection from the subscriber TN to the subscriber TN2. The service switching point SSP then sends a connection message S2 to the subscriber TN2, who in this simple example is connected to the same service switching point SSP.

If, on resolving the service number, the service control point SCP determines that the called service is to be performed in the intelligent network of another network operator (case b), then it sends this information with the message CON containing the address of the network operator back to the service switching point SSP, which then transfers the call to an agreed switching center of this network operator. The process for resolving the service number described in the last paragraph is then repeated.

An exemplary process for the case (case c) where the service number is unknown in the service control point SCP is described in the following FIG. 2.

FIG. 2 shows from left to right the first subscriber TN, and the network operator TP from FIG. 1. The service switching point SSP and the service control point SCP are again shown as units of the network operator TP, where the arrow S1 again leads from the subscriber TN to the service switching point SSP and from there the arrow IDP leads to the service control point SCP. Differing from FIG. 1, instead of the arrow CON an arrow REL leads back to the service switching point and from there an arrow S3 leads back to the subscriber TN. Here, analogous to the arrows known from FIG. 1, the arrows S3 and REL again represent messages transmitted in the direction of the arrow.

The subscriber TN again dials a specific service number transmitted with the message S1, which is recognized by the service switching point SSP as an IN service call, which then informs the service control point SCP about the call with the message IDP. In this example it is intended that this is a service number that the service control point SCP cannot resolve. With the message REL it then transfers the request to clear the connection to the service switching point SSP, which then informs the subscriber TN of the call release with the message S3.

As described above, with today's intelligent networks, because of the demanded service number portability, a service number may only be unknown when it actually does not exist, that is to say if the subscriber has dialed an invalid service number. For this, each network operator to which a service call is directed must ensure that the called IN service is forwarded at the point where the service is provided. For a local network operator, for example, whose IN services make up only a small part of the total existing national IN services, this means that he has to forward the majority of the IN calls for resolution of the service number. To do this, for each existing national service number, provided he does not handle these himself, he has to at least know to which network operator the service call is to be delivered. Since new numbers are constantly added and existing numbers are changed or deleted, this means a large outlay in order to maintain a database with such data. As mentioned above, today the only option open to a local network provider to reduce this expense is basically to transfer all service calls initially to a large national network provider who handles the resolution of the service number and when the service call is provided in the intelligent network of the local network provider, then returns the service call.

The process according to the invention is explained below with the aid of FIG. 3, in which process the service calls can be directly handled in the intelligent network of a local network operator, for example, without this network operator needing to resolve service numbers which do not call up any IN service in his network.

By way of an example, FIG. 3 shows from left to right a subscriber TN, a local network operator LTP and a national network operator NTP. A service switching point SSP' and a service control point SCP are shown here as units of the local network operator LTP. A switching center VST is shown as a unit of the country-wide network operator. As in FIG. 2, the arrow S1 leads from the subscriber TN to the service switching point SSP', from there the arrow IDP leads to the service control point SCP and from there the arrow REL leads back to the service switching point SSP'. Differing from FIG. 2, an arrow S4, now also representing a message, leads from the service switching point SSP' to the switching center VST.

In contrast to the service switching point SSP represented in the preceding figures, the service switching point SSP' is extended by an additional function for forwarding unknown service calls.

First of all the process described under FIG. 2 runs in precisely the same way: the subscriber TN dials a specific service number S1 that is recognized by the service switching point SSP' as an TN service call, which then informs the service control point SCP of the call via the message IDP. In this example a service call is involved that is not provided in the network of the local network operator LTP. The service control point SCP only recognizes service numbers of IN services that are provided in the actual network of the local network operator LTP. In the case of an unknown service number, as described in FIG. 2, it passes the message REL back to the service switching point SSP'. Differing from the process described under FIG. 2, the service switching point SSP, does not now initiate the clearing of the connection, but forwards the service call with the message S4 containing the service number to the switching center VST of the national network provider NTP. The switching center of the national network provider NTP can again involve a service switching point which continues the process described under FIG. 1. According to this process, several networks could be traversed before the service number can finally be resolved in a network.

Basically, two processes can be considered when the intelligent networks of different network operators act in combination:

In the first process there is no facility SCP in any network of the network operator, which can resolve all service numbers. A service call is then forwarded until the network is found in which the service number can be resolved. The more network operators with an intelligent network there are in a telecommunication network, there will on average be more of these networks through which a service call will pass. The waiting time for the service customers therefore also increases. Moreover, an error in the input of a service number will frequently remain undetected: the call is forwarded from one network operator to the next network operator until the call is cleared down by the subscriber or by a network monitoring facility. The negative effect of this process can be reduced in that further service numbers of neighboring network operators, for example, over and above the particular service numbers, are known by each network operator.

In the second process, at least one facility is present in the intelligent network of a national network operator NTP, for example, which resolves all existing national service numbers, that is to say the network operator knows in which of the service numbers the service call is being processed. Provided they manage an independent intelligent network, local network operators LTP resolve their own service numbers and transfer the service calls with non-resolved service numbers to the national network operator NTP who guarantees the resolution of these service numbers.

The second process appears advantageous, especially for countries with dominant national network operators. Since the allocation and management of service numbers is frequently effected with the help of the national network operator's network facilities anyway, this process enables the newly emerging local network operators to operate an independent intelligent network at low cost, without necessitating modifications in the network facilities of the national network operator.

What is claimed is:

1. A method for routing service calls in a telecommunication network, with a switching center recognizing the service calls and a control facility for controlling the service calls, the method comprises:

recognizing a call coming from a subscriber as a service call, wherein the switching center informs the control facility by sending an information signal, if the control facility cannot resolve the service number to a physical address, or cannot determine the network operator, in whose network the service is provided, the control facility informs the switching center with a message, and the switching center transfers the service call to another switching center to a switching center of another network operator that continues the processing of the service call.

2. A telecommunication network comprising with a switching center that recognizes a service call of a subscriber and a control facility that controls the service call, the control facility comprising, means for resolving a service number, and the switching center comprises forwarding means that forward a service call of a service number to a further switching center if the control facility cannot resolve the service number to a physical address, or cannot determine the network operator, in whose network the service is provided.

3. A switching center with recognition means for recognizing service calls of a subscriber and communication means for exchanging messages with a control unit for controlling service calls, further comprising forwarding means forward the service call to another switching center on receipt of a message from the control unit (SCP) when the control unit cannot resolve the service number to a physical address, or cannot determine the network operator, in whose network the service is provided.

4. A program module to be executed in a switching center when a call is received at the switching center, the program module comprising the following steps:

recognizing the call coming from a subscriber as a service call, wherein the switching center informs a control facility by sending an information signal, if the control facility cannot resolve a service number to a physical address, or cannot determine the network operator, in whose network the service is provided, the control facility informs the switching center with a message, and the switching center transfers the service call to a switching center of another network operator that continues the processing of the service call.

* * * * *